United States Patent
Kao et al.

(10) Patent No.: US 11,625,691 B2
(45) Date of Patent: Apr. 11, 2023

(54) METHOD FOR FACILITATING RECYCLING

(71) Applicant: SIMPLE GREEN CO., LTD., Huatan Township (TW)

(72) Inventors: Chen-I Kao, Huatan Township (TW); Shang-Chieh Kao, Huatan Township (TW); Shu-Chen Huang, Huatan Township (TW); Yu-Chuan Wu, Huatan Township (TW); Hsueh-Fang Kao, Douliou (TW); Yung-Ping Lai, Huatan Township (TW); Boghosian Glenn Malcolm, Beverly Hills, CA (US)

(73) Assignee: SIMPLE GREEN CO., LTD., Huatan Township, Changhua County (TW)

( * ) Notice: Subject to any disclaimer, the term of this patent is extended or adjusted under 35 U.S.C. 154(b) by 360 days.

(21) Appl. No.: 16/709,195

(22) Filed: Dec. 10, 2019

(65) Prior Publication Data

US 2020/0118088 A1    Apr. 16, 2020

Related U.S. Application Data

(63) Continuation-in-part of application No. 15/435,490, filed on Feb. 17, 2017, now abandoned.

(30) Foreign Application Priority Data

Feb. 26, 2016   (TW) .................................. 105105908

(51) Int. Cl.
    *G06Q 10/00*       (2012.01)
    *B65F 1/14*        (2006.01)
    (Continued)

(52) U.S. Cl.
    CPC ........... *G06Q 10/30* (2013.01); *B65F 1/1484* (2013.01); *G06Q 30/0208* (2013.01)

(58) Field of Classification Search
    None
    See application file for complete search history.

(56) References Cited

U.S. PATENT DOCUMENTS

| | | |
|---|---|---|
| 9,108,797 B1 | 8/2015 | Borges et al. |
| 2004/0129781 A1* | 7/2004 | Kreiner ................. G06Q 10/08 235/385 |

(Continued)

FOREIGN PATENT DOCUMENTS

| | | | |
|---|---|---|---|
| EP | 3081109 A1 * | 10/2016 | ............ A41B 11/00 |
| TW | M320718 U | 10/2007 | |
| TW | 201519141 A | 5/2015 | |

OTHER PUBLICATIONS

Leighton ("Under Armour's new 'smart shoes' give runners real-time and post-workout data on their fitness performance," Insider Reviews, Sep. 5, 2018, available online at https://www.insider.com/guides/style/under-armour-hovr-review-smart-shoes-2018-3 (Year: 2018).*

*Primary Examiner* — Jan P Mincarelli
(74) *Attorney, Agent, or Firm* — Cheng-Ju Chiang

(57) ABSTRACT

A method for facilitating recycling an object is provided. The object is produced to include a detecting device that detects a condition of the object, and wirelessly sends out the detected condition of the object, so that a dealer shop may receive the detected condition of the object, and send the same to a server. The server determines whether the object has worn out based on the detected condition, and sends a message to a mobile device related to a consumer of the object for notifying the consumer that the object has worn out, thereby motivating the consumer to recycle the object.

11 Claims, 3 Drawing Sheets

(51) Int. Cl.
*G06Q 30/02* (2012.01)
*G06Q 10/30* (2023.01)
*G06Q 30/0208* (2023.01)

(56) References Cited

U.S. PATENT DOCUMENTS

| | | |
|---|---|---|
| 2010/0185506 A1 | 7/2010 | Wolff et al. |
| 2011/0153614 A1* | 6/2011 | Solomon .............. G06Q 10/087 |
| | | 707/740 |
| 2012/0209783 A1* | 8/2012 | Smith, Jr. ............ G06Q 20/123 |
| | | 705/308 |
| 2014/0062703 A1* | 3/2014 | Purks ................... A61B 5/1038 |
| | | 340/573.1 |
| 2014/0067508 A1 | 3/2014 | Tarbert et al. |
| 2020/0010271 A1* | 1/2020 | Bourn ................... G06V 10/82 |

* cited by examiner

METHOD FOR FACILITATING RECYCLING

CROSS-REFERENCE TO RELATED APPLICATION

This application is a continuation-in-part (CIP) application of U.S. patent application Ser. No. 15/435,490, filed on Feb. 17, 2017, the contents of which are incorporated herein by reference, and which claims priority of Taiwanese Invention Patent Application No. 105105908, filed on Feb. 26, 2016.

FIELD

The disclosure relates to a method for facilitating recycling, and more particularly to a method for facilitating recycling of an object by sensing identification information of the object.

BACKGROUND

In order to reduce environmental burden resulting from garbage, recycling has been promoted for years.

Recycling companies collect and resell various recyclable materials to green technology companies for conversion into reusable matter. Currently, brand dealers that sell commodities do not contribute to the recycling process.

In addition, there is no motivation for consumers to actively recycle commodities that will no longer be used, resulting in poor recycling efficiency.

SUMMARY

Therefore, an object of the disclosure is to provide a method for facilitating recycling.

According to the disclosure, the method includes: A) producing an object that corresponds to a brand, that stores identification information associated with the object, and that is mounted with a detecting device including a detector, a microcontroller, and a wireless transmitter; B) by the detector, periodically detecting a condition of the object, and generating detected object condition data that indicates the condition of the object; C) by the microcontroller, receiving the detected object condition data from the detector, and generating condition information for the object based on the detected object condition data; D) by the microcontroller, generating object information that includes the identification information and the condition information, and sending the object information to the first wireless transmitter; E) by the wireless transmitter, sending out the object information wirelessly; F) by a terminal device that is placed in a dealer shop related to the brand, upon receipt of the object information sent by the wireless transmitter, transmitting the object information to a server that is communicatively coupled to the terminal device through a communication network and that stores device information corresponding to a mobile device and the object; G) by the server, determining whether the object has worn out based on the object information; and H) by the server, upon determining that the object has worn out, sending a worn-out message to the mobile device that corresponds to the device information for notifying a user of the mobile device that the object has worn out to motivate the user of the mobile device to recycle the object.

BRIEF DESCRIPTION OF THE DRAWINGS

Other features and advantages of the disclosure will become apparent in the following detailed description of the embodiment(s) with reference to the accompanying drawings, of which.

DETAILED DESCRIPTION

Figure 1:
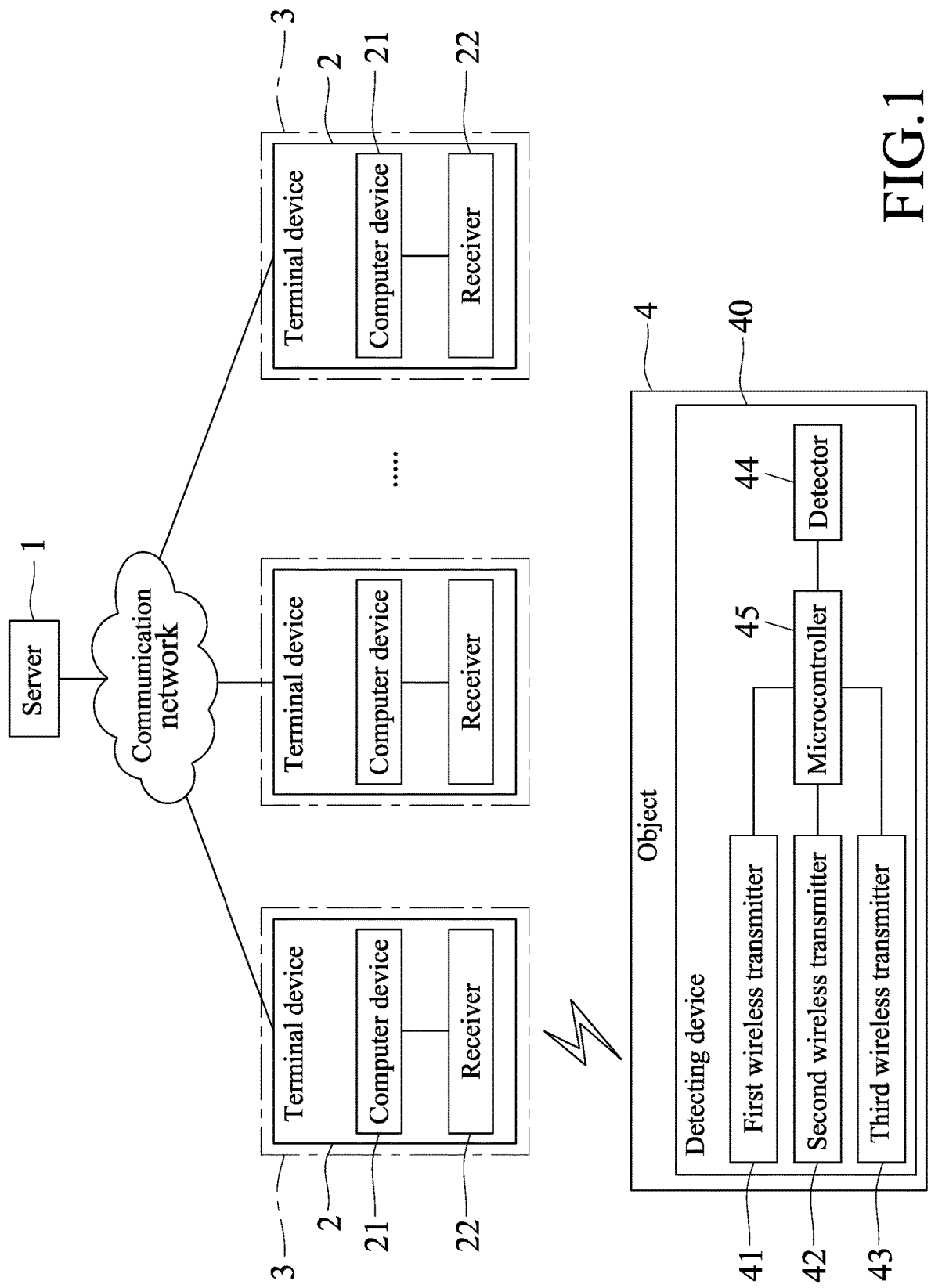
FIG. 1 is a block diagram illustrating devices used to implement an embodiment of the method for facilitating recycling according to the disclosure.

Before the disclosure is described in greater detail, it should be noted that where considered appropriate, reference numerals or terminal portions of reference numerals have been repeated among the figures to indicate corresponding or analogous elements, which may optionally have similar characteristics.

Referring to FIG. 1, the embodiment of the method for facilitating recycling of an object 4 according to this disclosure is implemented using a server 1 and terminal devices 2 each being communicatively coupled to the server 1 through a communication network. The object 4 corresponds to a brand, is produced to store identification information related to the object 4 (e.g., category information and model information corresponding to the object 4) and factory inspection data related to a condition of the object 4 when the object 4 underwent inspection before output from a factory (e.g., a weight or a thickness of a sole if the object 4 is a pair of shoes), and is mounted with a detecting device 40.

The detecting device 40 includes a first wireless transmitter 41, a second wireless transmitter 42, a third wireless transmitter 43, a detector 44, and a microcontroller 45. In this embodiment, the second wireless transmitter 42 has an effective signal transmission distance/range shorter than that of the first wireless transmitter 41, and the third wireless transmitter 43 has an effective signal transmission distance/range shorter than that of the second wireless transmitter 42, but this disclosure is not limited in this respect. In one example, the object 4 is a pair of shoes, and the transmitters 41 to 43 may be embedded in the soles of the shoes.

The detector 44 is configured to periodically detect a condition of the object 4, and to generate detected object condition data that indicates the condition of the object 4. In this embodiment, the detector 44 is exemplified as a weighing scale that detects a weight of the object 4, and the detected object condition data is related to the weight of the object 4. In one embodiment, the detector 44 may be a thickness measurement device (e.g., an ultrasonic thickness gauge) that detects a thickness of a specific part of the object 4 (e.g., a sole of a shoe), and the detected object condition data is related to the thickness of the specific part of the object 4.

The microcontroller 45 is electrically coupled to the first to third wireless transmitters 41-43 and the detector 44. Upon receipt of the detected object condition data from the detector 44, the microcontroller 45 generates condition information related to a level of wear of the object 4 based on the detected object condition data and the factory inspection data. When the detected object condition data is related to the weight of the object 4, the level of wear may be acquired based on the current weight (detected by the detector 44) and the original weight (indicated in the factory inspection data) of the object 4. When the detected object condition data is related to the thickness of a specific part of the object 4, the level of wear may be acquired based on the current thickness (detected by the detector 44) and the original thickness (indicated in the factory inspection data) of the specific part of the object 4. It is noted that, in the case that the detector 44 is a weighing scale, to prevent the weighing result from being affected by a person who wears the shoes, the microcontroller 45 determines, based on the detected object condition data, whether the weight of the object 4 falls within a predefined weight range. The microcontroller 45 generates the condition information upon determining that the weight of the object 4 falls within the predefined weight range (defined as a range that corresponds to a condition that nobody is wearing the shoe, such as under one kilogram), and does not generate the condition information when otherwise. After generation of the condition information, the microcontroller 45 generates object information that includes the identification information and the condition information, and sends the object information to the first to third wireless transmitters 41-43 for the first to third wireless transmitters 41-43 to store the object information therein and to wirelessly send out the object information.

Each terminal device 2 is placed in a respective dealer shop 3 related to the brand, and includes a computer device 21 and a receiver 22 that is coupled to the computer device 21 and that is configured to wirelessly receive the object information sent out by the detecting device 40. In this embodiment, the receiver 22 is an RFID reader; the first wireless transmitter 41 is an active RFID tag which includes a battery and which is configured to actively, wirelessly and periodically transmit the object information, so the receiver 22 receives the object information when located within a specific distance, for example, two hundred meters, from the first wireless transmitter 41; the second wireless transmitter 42 is a passive RFID tag which is battery-less and which is configured to be triggered by the receiver 22 when located within a specific distance, for example, one meter, from the receiver 22 for wireless transmission of the object information, so the receiver 22 receives the object information therefrom; and the third wireless transmitter 43 is a near-field communication (NFC) tag which is configured to wirelessly transmit the object information to a mobile device that is compatible with NFC standards. The server 1 stores object history information that corresponds to the object 4, and that may include the category information, the model information, a manufacturing date, a recommended expiry date, etc.

Figure 2:
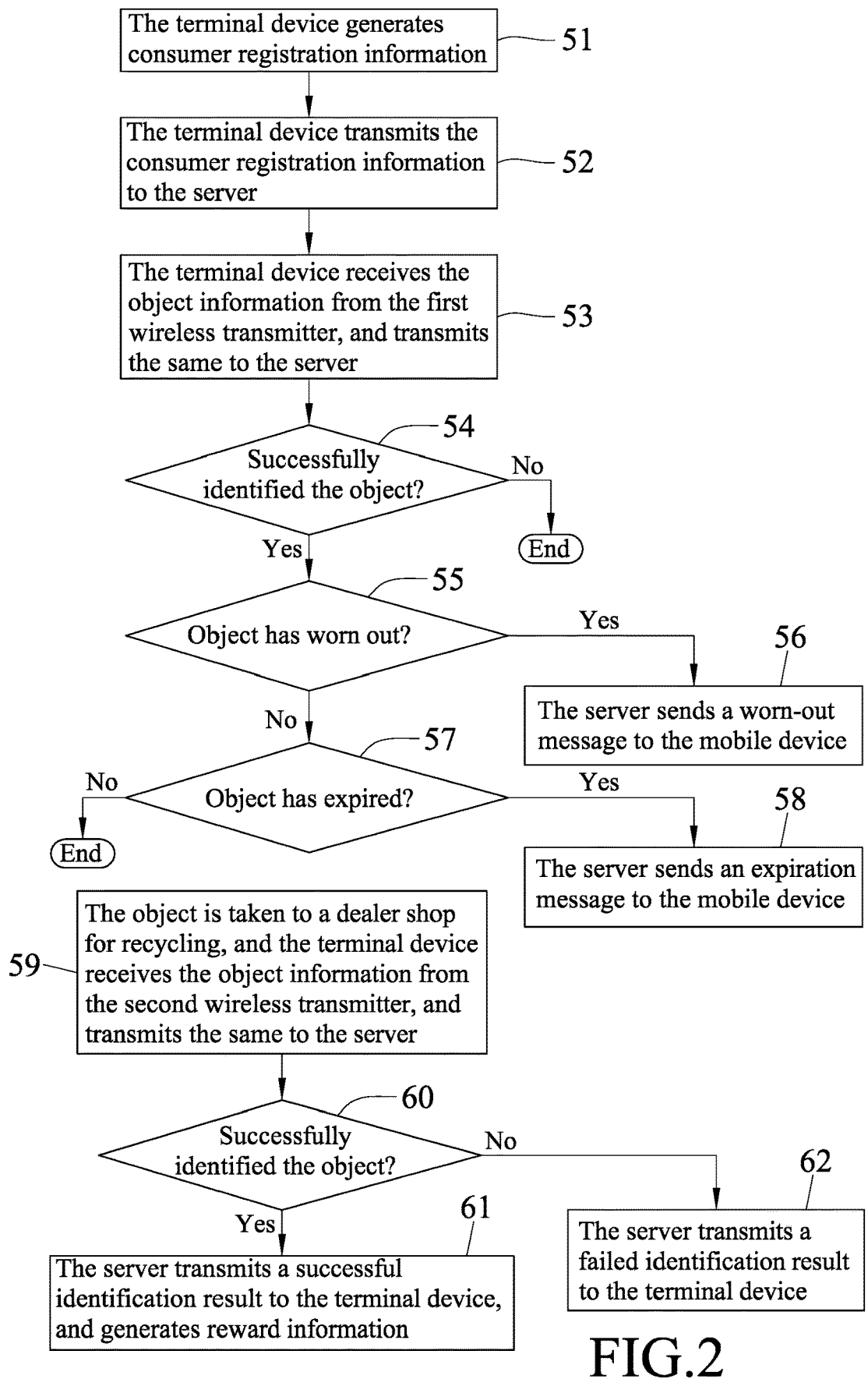
FIG. 2 is a flow chart illustrating steps of the embodiment.

Further referring to FIG. 2, an embodiment of the method according to this disclosure is shown to include steps 51-62. In step 51, a consumer purchases the object 4 in one of the dealer shops 3 associated with the brand, and makes a registration with the brand so that the computer device 21 of the dealer shop 3 generates consumer registration information and associates the same with the first and second identification information of the object 4. The consumer registration information may include personal information of the consumer, the category information and the model information of the object 4, device information that corresponds to a mobile device (e.g., a mobile phone number) of the consumer, etc.

In step 52, the computer device 21 transmits the consumer registration information to the server 1 for storage therein.

When the consumer takes the object 4 and for instance, walks in a vicinity of one of the dealer shops 3 so that the dealer shop 3 is within an effective signal transmission range of the first wireless transmitter 41, the terminal device 2 in the one of the dealer shops 3 receives, through the receiver 22, the object information that is actively, periodically and wirelessly sent out by the first wireless transmitter 41, and transmits the object information to the server 1 (step 53).

In step 54, the server 1 identifies whether or not the object 4 is a product of the brand or was sold by a dealer of the brand. If the server 1 successfully identifies the object 4 by comparing the object history information and the identification information after receipt of the object information, the flow goes to step 55. Otherwise, the flow ends.

In step 55, the server 1 determines whether the object 4 has worn out based on the object information. The flow goes to step 56 when the server 1 determines that the object 4 has worn out, and goes to step 57 when otherwise.

In step 56, the server 1 sends a worn-out message to the mobile device that corresponds to the device information for notifying the consumer (i.e., the user of the mobile device) that the object 4 has worn out, so as to motivate the user of the mobile device to recycle the object 4.

In step 57, the server 1 determines whether or not the object 4 has expired based on the recommended expiry date. The flow goes to step 58 when the determination is affirmative, and ends when otherwise.

In step 58, the server 1 sends an expiration message which indicates that the object 4 has expired to the consumer's mobile device according to the device information of the consumer registration information.

In the case that the object 4 is a pair of shoes, when the consumer puts on the shoes which have worn out or have exceeded the recommended expiry date and walks in a vicinity of one of the dealer shops 3, the consumer's mobile device may receive from the server 1 a message (e.g., the worn-out message or the expiration message) which indicates that the shoes have worn out or have expired. In one embodiment, the message further includes an address of the dealer shop 3, so that the consumer is made aware of the presence of the dealer shop 3 nearby, thereby enhancing motivation of the consumer to go into the dealer shop 3 for recycling the shoes and even buying another pair.

When the consumer is motivated by the message and takes the object 4 to one of the dealer shops 3 for recycling, a staff of the dealer shop 3 may operate the terminal device 2 so the terminal device 2 receives the object information transmitted by the second transmitter 42, and the computer device 21 transmits the object information to the server 1 (step 59).

In step 60, the server 1 identifies whether or not the object 4 is a product of the brand or was sold by a dealer of the brand based on the identification information included in the object information. The flow goes to step 61 when the server 1 successfully identifies the object 4 (i.e., identifying that the object 4 is a product of the brand or was sold by a dealer of the brand) based on the identification information, and goes to step 62 when the server 1 does not successfully identify the object 4 (i.e., the server 1 cannot identify that the object 4 is a product of the brand or was sold by a dealer of the brand) based on the identification information.

In step 61, the server 1 transmits a successful identification result to the terminal device 2, generates reward information (e.g., bonus points, electronic coupons, etc.) corresponding to the category information and the model information, and records the reward information in the consumer registration information.

In step 62, the server 1 transmits a failed identification result, which indicates that the server 1 was unable to identify the object 4, to the terminal device 2.

If the consumer wishes to recycle an object 4 which has not worn out and has not expired, the consumer may still take the object 4 to one of the dealer shops 3 for recycling the same and thus acquiring the reward information as mentioned in steps 59-61 without having received the message which indicates that the object 4 has expired. Accordingly, even if the object 4 includes only the second wireless transmitter 42 to transmit the object information and omits the first wireless transmitter 41, the recycling of the object 4 in accordance with this disclosure may still be performed in the dealer shops 3. It is noted that the consumer may check the level of wear by using his/her mobile device to receive the object information from the third wireless transmitter 43, which is an NFC tag in this embodiment. Upon receipt of the object information sent by the third wireless transmitter 43, the mobile device may display the object information on a screen thereof.

Figure 3:
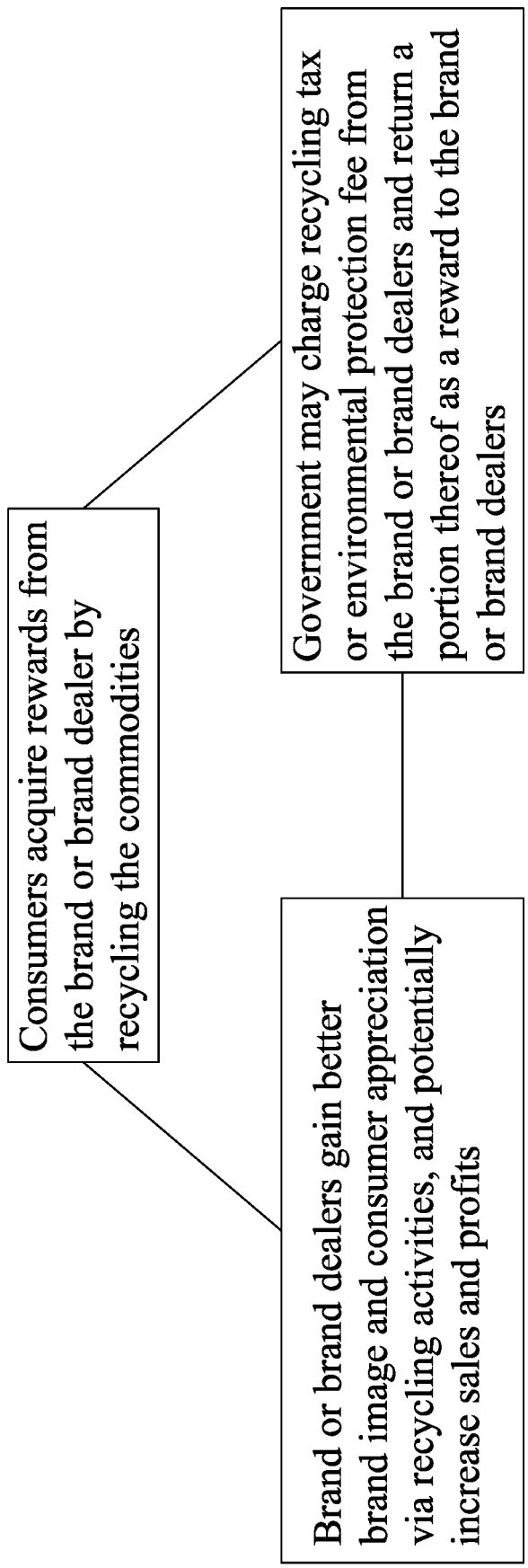
FIG. 3 illustrates advantages of the embodiment.

In this embodiment, provision of the reward information after recycling of the object 4 may enhance motivation of the consumer to recycle the object 4. Furthermore, increase in number of the dealer shops 3 may facilitate recycling of the object 4 by consumers, thereby promoting recycling efficiency, and dealers of the brand may have more contribution to recycling and environmental protection, fulfilling corporate social responsibility. Referring to FIG. 3, the embodiment not only promotes recycling efficiency and reduces garbage, and may also accomplish the following advantages for consumers, the government and the brand dealers.

1. Consumers may acquire rewards from the brand or brand dealers by recycling commodities sold of the brand or sold by the brand dealers, thereby enhancing motivation to recycle.

2. Recycling activities may promote brand image and consumer appreciation. In addition, consumers may also purchase other commodities when visiting the dealer shops 3 to recycle the objects 4. As a result, the brand dealers may achieve better sales and profits.

3. The government that charges recycling tax or environmental protection fee from the brand or brand dealers may refund a portion of the charge to the brand or brand dealers to serve as a reward for recycling.

In one embodiment, the consumer may purchase the object 4 via an electronic commerce platform (e.g., "Yahoo!", "Amazon.com", etc.) that is communicatively coupled to the server 1 through the communication network, and input the consumer registration information through the electronic commerce platform, so the electronic commerce platform generates the consumer registration information and transmits the same to the server 1 for storage therein. In other words, the consumer may purchase the object 4 on the electronic commerce platform, and recycle the object 4 in one of the dealer shops 3.

In one embodiment, the object 4 may include only the first wireless transmitter 41 to transmit the object information and omit the second wireless transmitter 42. In addition to being used in determining whether or not the object 4 has expired, the object information sent by the first wireless transmitter 41 is used for identifying the object 4 when the consumer takes the object 4 to the dealer shop 3 for recycling. In this embodiment, the battery for the first wireless transmitter 41 may be a long-lasting battery, so as to prevent the first wireless transmitter 41 from having no power when the object 4 is to be recycled in the dealer shop 3. In one embodiment, the object 4 may further include a micro vibration power generator (not shown) to provide electrical power for the battery. In the case that the object 4 is the pair of shoes, the vibration power generator may be embedded in the soles of the shoes, so the vibration power generator generates electrical power to charge the battery of the first wireless transmitter 41 when the consumer walks in the shoes.

In one embodiment, the object 4 includes a barcode containing the identification information, and each terminal device 2 further includes a barcode scanner (not shown). In this configuration, the object 4 may be identified by the barcode scanner scanning the barcode to acquire the identification information even if the transmitters 41, 42 become nonfunctional.

In one embodiment, a portion of the object 4 may be made of a specific material, so that the object 4 may be identified by identifying the specific material when the transmitters 41, 42 become nonfunctional. In the case that the object 4 is the pair of shoes, the vamps of the shoes may be made of a biomaterial so the shoes may be identified by sensing protease included in the vamps; the vamps of the shoes may be made of a composite material, such as being woven with steel wires, so the shoes may be identified by sensing a ratio of the alloy components in the steel wires; or the vamps of the shoes may be made of a material having a particular compound formula design, so the shoes may be identified by identifying the compound.

In summary, the method according to this disclosure facilitates recycling by producing commodities that periodically sends out the object information which includes the condition information and the identification information, so that the terminal devices 2 placed in the dealer shops 3 can receive the object information sent by the commodities and provide the same to the server 1 for identifying the commodities and sending a message to notify the consumer of recycling the commodities when the commodities has worn out or has expired, thereby promoting recycling efficiency. Furthermore, the method according to this disclosure enhances motivation of the consumer to recycle by the server 1 giving the rewards to the consumer for recycling.

In the description above, for the purposes of explanation, numerous specific details have been set forth in order to provide a thorough understanding of the embodiment(s). It will be apparent, however, to one skilled in the art, that one or more other embodiments may be practiced without some of these specific details. It should also be appreciated that reference throughout this specification to "one embodiment," "an embodiment," an embodiment with an indication of an ordinal number and so forth means that a particular feature, structure, or characteristic may be included in the practice of the disclosure. It should be further appreciated that in the description, various features are sometimes grouped together in a single embodiment, figure, or description thereof for the purpose of streamlining the disclosure and aiding in the understanding of various inventive aspects.

While the disclosure has been described in connection with what is (are) considered the exemplary embodiment(s), it is understood that this disclosure is not limited to the disclosed embodiment(s) but is intended to cover various arrangements included within the spirit and scope of the broadest interpretation so as to encompass all such modifications and equivalent arrangements.

What is claimed is:

1. A method for facilitating recycling, said method comprising:
   A) producing an object that corresponds to a brand, that stores identification information associated with the object, and that is mounted with a detector, a microcontroller, and at least two wireless transmitters including a first wireless transmitter which is an active transmitter with a power source, and a second wireless transmitter which is a passive transmitter without any power source and has a shorter effective signal transmission distance than the first wireless transmitter;

B) by the detector, periodically detecting a condition of the object, and generating detected object condition data that indicates the condition of the object;

C) by the microcontroller, receiving the detected object condition data from the detector, and generating condition information for the object based on the detected object condition data;

D) by the microcontroller, generating object information that includes the identification information and the condition information, and sending the object information to the at least two wireless transmitters;

E) by the first wireless transmitter, periodically and actively sending out the object information wirelessly;

F) by a terminal device that is placed in a dealer shop related to the brand, upon receipt of the object information sent by the first wireless transmitter, transmitting the object information to a server that is communicatively coupled to the terminal device through a communication network and that stores device information corresponding to a mobile device and the object;

G) by the server, determining whether the object has worn out based on the object information; and H) by the server, upon determining that the object has worn out, sending a worn-out message to the mobile device that corresponds to the device information for notifying a user of the mobile device that the object has worn out to motivate the user of the mobile device to recycle the object;

I) by the terminal device, receiving the object information through the second wireless transmitter when the user decides to recycle the object in response to the worn-out message.

2. The method of claim 1, wherein, in step C), the condition information is related to a level of wear of the object, and is generated based on the detected object condition data and factory inspection data that is related to a condition of the object when the object underwent inspection before output from a factory.

3. The method of claim 1, further comprising:

I) by the server, upon determining that the object has not worn out, determining whether the object has expired based on the identification information; and J) by the server, upon determining that the object has expired, sending an expiration message which indicates that the object has expired to the mobile device based on the device information.

4. The method of claim 1, wherein the object produced in step A) is further mounted with a third wireless transmitter having an effective signal transmission distance shorter than that of the second wireless transmitter; and said method further comprising:

J) by the third wireless transmitter, sending out the object information wirelessly; and K) by the mobile device, upon receipt of the object information sent by the second wireless transmitter, displaying the object information.

5. The method of claim 4, wherein the first wireless transmitter is a radio frequency identification (RFID) tag, the second wireless transmitter is a passive RFID tag and the third wireless transmitter is a near-field communication (NFC) tag.

6. The method of claim 1, wherein said method further comprising:

J) by the terminal device, upon receipt of the object information sent by the second wireless transmitter, transmitting the object information to the server;

K) by the server, identifying the object based on the identification information included in the object information; and L) by the server, transmitting to the terminal device an identification result that corresponds to the object for recycling of the object.

7. The method of claim 6, wherein the first wireless transmitter is an active radio frequency identification (RFID) tag, and the second wireless transmitter is a passive RFID tag.

8. The method of claim 1, further comprising: by one of the terminal device and a terminal device that is placed in another dealer shop related to the brand and that is communicatively coupled to the server through the communication network, generating the device information and transmitting the device information to the server for storage therein.

9. The method of claim 1, further comprising: by an electronic commerce platform that is communicatively coupled to the server through the communication network, generating the device information and transmitting the device information to the server for storage therein.

10. The method of claim 1, wherein the identification information includes category information and model information corresponding to the object, and the server includes consumer registration information corresponding to the identification information;

said method further comprising:

upon the server successfully identifying the object based on the identification information included in the object information, the server generating reward information corresponding to the category information and the model information, and recording the reward information in the consumer registration information.

11. The method of claim 6, wherein: the object produced in step A) further includes a barcode containing the identification information; the terminal device further includes a barcode scanner; and said method further comprises:

by the terminal device, receiving the identification information through the barcode scanner scanning the barcode, and transmitting the identification information to the server through the communication network;

by the server, identifying the object based on the identification information received from the terminal device; and by the server, transmitting to the terminal device an identification result that corresponds to the object for recycling of the object.

* * * * *